Patented Dec. 26, 1922.

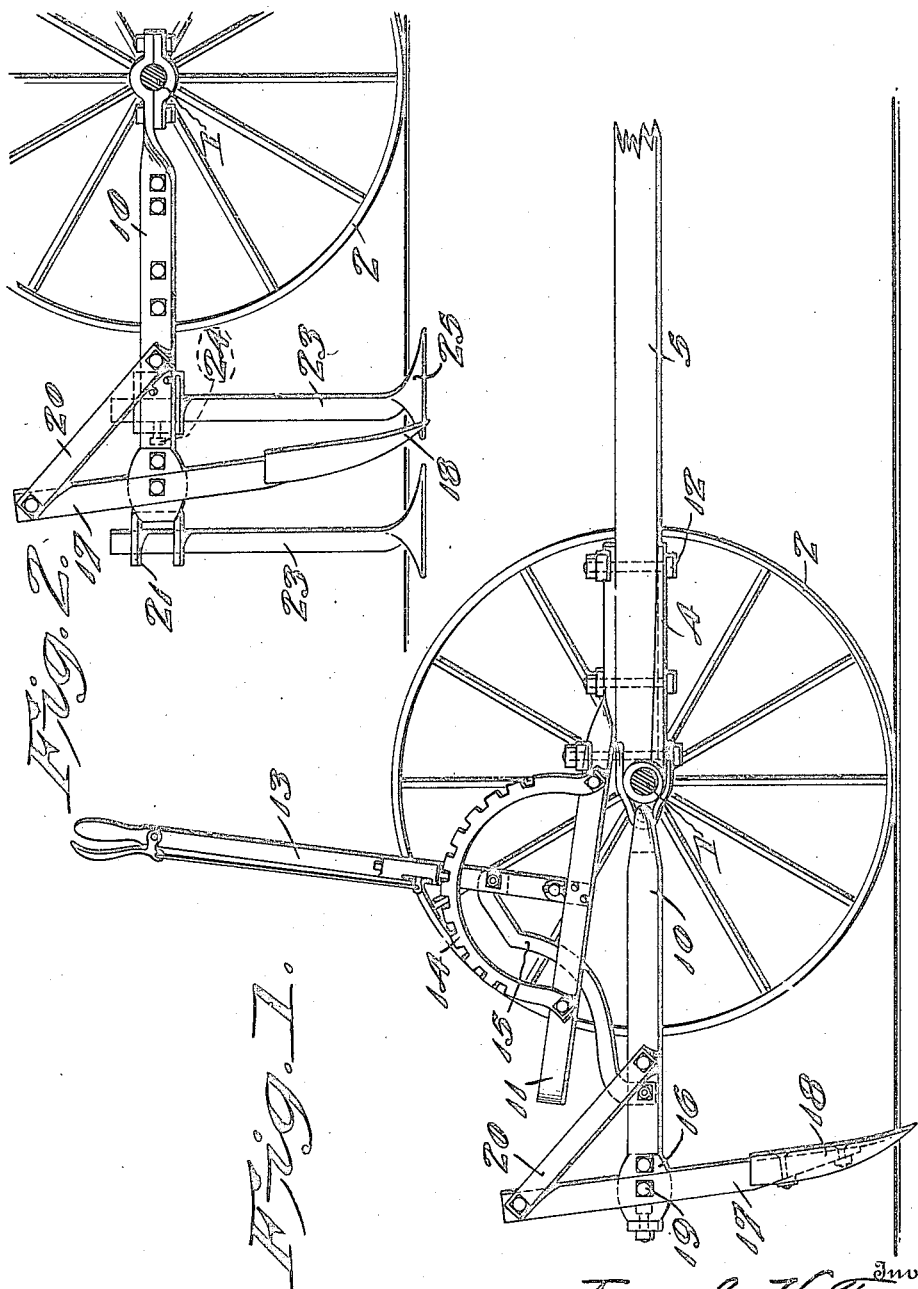

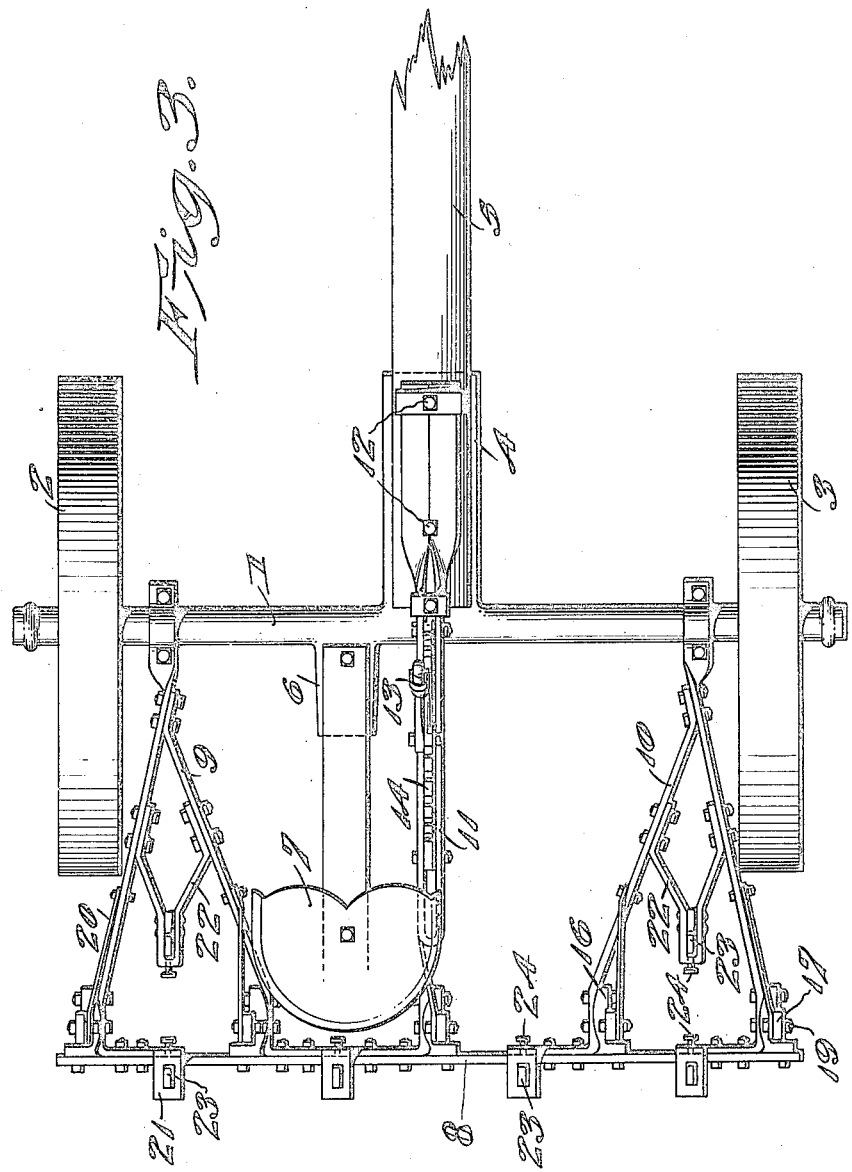

1,440,216

UNITED STATES PATENT OFFICE.

JOSEPH H. FISHER, OF MEADOW, UTAH.

CULTIVATOR.

Application filed September 9, 1920. Serial No. 409,203.

*To all whom it may concern:*

Be it known that I, JOSEPH H. FISHER, a citizen of the United States, residing at Meadow, in the county of Millard and State of Utah, have invented certain new and useful Improvements in Cultivators, of which the following is a specification.

This invention relates to cultivators, and particularly to a wheeled or riding cultivator structure adapted for use in cultivating grain, corn, alfalfa and other growing crops, and for general weeding.

An object is to provide a cultivator which can be used for cultivating or weeding different growing crops, and which allows for adjustment setting, and arrangement of the parts to accomplish the most efficient operation on the different growing vegetation, and in different conditions of planting and varieties of soil.

A further object is to so construct and arrange the parts that major adjustments, such as the fitting and placing of different cultivator shovels, can be accomplished quickly and with facility; and, that those adjustments required to suit the condition of soil and to give various depths of cultivation can be made by the operator riding on the cultivator.

With these and other objects in view, which will be apparent from the drawings, specification, and claims, this invention includes certain novel features of construction and combinations of parts which will now be set forth.

In the drawings:

Fig. 1 is a view in side elevation of a cultivator constructed in accordance with my invention, and with the seat and one of the wheels removed to better show the structure.

Fig. 2 is a fragmentary view in elevation of the rear portion of the cultivator showing a different arrangement of cultivator shovels.

Fig. 3 is a top plan view of the cultivator.

An axle 1, on which wheels 2 and 3, are mounted has a forward extension 4, to which tongue 5 is connected, and a rearward extension 6, which supports a seat 7, for the operator.

A shovel beam 8, has the substantially V-shaped draw bars 9 and 10 secured adjacent the ends thereof, and these draw bars are connected at their inner ends to axle 1, to have swinging movement in a vertical plane. A double armed supporting member 11 is secured at its ends on the tongue 5, by means of bolts 12, and has its loop end extending rearwardly and upwardly at an angle from the tongue so that it overhangs adjacent the shovel beam. A hand lever 13 is given swinging mounting on the supporting member 11, and a rack 14 is secured on this member to hold the hand lever in set positions. A link 15 pivotally connected at one end on the lever 13, and at its remaining end has connection with shovel beam 8.

Brackets 16 are carried on beam 8, and shovel standards 17 having shovels 18 thereon are mounted on these brackets by bolts 19. To stiffen the mounting of standards 17 brace rods 20 are connected with the upper ends of these standards and are extended obliquely to and connected with the draw bars 9 and 10.

By this construction and arrangement of the parts, the shovels are rigidly held and are mounted to receive a direct draft pull from the tongue through the draw bars; and, through provision of the hand lever mounted adjacent the seat 7 the operator can readily vary and set the adjustment of the shovels to suit different conditions of operation.

In Figs. 2 and 3 I have shown a slightly different arrangement of cutters and here bracket clips 21 are mounted on beam 8, intermediate of the brackets 16, while shovel brackets 22 are mounted on draw bars 9 and 10. Shovel arms 23 are fitted in the bracket clips 21 and brackets 22, and these are held in place by set bolts 24. As shown in Fig. 2, the shovels 25 are in the form of crow-foot cutters to be used as weeders, but other forms may be employed.

While, in the foregoing, I have described specific embodiments, and have mentioned only certain possible modifications, it will be appreciated that in practice I may resort to other practical modifications falling within the scope of the appended claims.

I claim:

1. An agricultural implement of the character described, consisting of the axle formed with a forward and rearward extension, the wheels, the tongue, having its inner end secured to the forward extension of the axle, the seat connected to said rearward extension of the axle, a double armed supporting member secured to the tongue, a rack secured to said supporting member, a hand lever pivoted on said member, a detent for engaging said rack carried by said lever, draw bars having their inner ends swingingly connected to the axle, a link connecting said draw bars with the lever, a shovel beam connecting the draw bars, and shovels carried by said beam.

2. An agricultural implement of the character described consisting of the axle, the wheels, the forward extension on said axle, the tongue secured to said extension, the rearward extension on said axle, the seat support secured to said extension, the draw bars having a swinging connection with the axle, the hand bar and link for moving said draw bars, the shovel beam connecting the outer ends of said draw bars, shovel brackets carried by the beam and draw bars, and shovels having their arms mounted in said brackets.

In testimony whereof I affix my signature.

JOSEPH H. FISHER.